United States Patent [19]

Hodgdon et al.

[11] Patent Number: 4,505,797

[45] Date of Patent: Mar. 19, 1985

[54] ION-EXCHANGE MEMBRANES REINFORCED WITH NON-WOVEN CARBON FIBERS

[75] Inventors: Russell B. Hodgdon, Sudbury; Warren A. Waite, Burlington, both of Mass.

[73] Assignee: Ionics, Incorporated, Watertown, Mass.

[21] Appl. No.: 478,603

[22] Filed: Mar. 24, 1983

[51] Int. Cl.³ .................. C25B 9/00; C08D 5/20
[52] U.S. Cl. .................. 204/252; 204/296; 521/27; 521/28
[58] Field of Search ............ 521/27, 28; 204/252, 204/296

[56] References Cited

U.S. PATENT DOCUMENTS

| | | | |
|---|---|---|---|
| 3,356,607 | 12/1967 | Eisenmann et al. | 204/296 |
| 4,341,615 | 7/1982 | Bachot | 204/296 |
| 4,388,227 | 6/1983 | Kalnin | 528/481 |

Primary Examiner—Joseph L. Schofer
Assistant Examiner—Peter F. Kulkosky
Attorney, Agent, or Firm—Norman E. Saliba

[57] ABSTRACT

This invention is directed to electrodialysis, electrochemical membrane cells and particularly to components comprising the ion-exchange membranes. These membranes are fabricated containing a reinforcing structure comprised of non-woven carbon fibers derived for example from carbonized polyacrylonitrile. The membranes so produced have a low D.C. electrical resistance (increased conductivity) which enables electrodialysis to be performed more economically.

5 Claims, No Drawings

ION-EXCHANGE MEMBRANES REINFORCED WITH NON-WOVEN CARBON FIBERS

BACKGROUND OF THE INVENTION

1. Field of the Invention

The present invention relates to cross-linked, electrically conductive ion-exchange polymers, especially ion-selective homogeneous membranes, containing a reinforcing material of non-woven carbonized polyacrylonitrile (PAN) fibers, to a method of preparing the carbonized PAN reinforced (backed) membranes and to electrochemical cells employing the same. More particularly the invention is directed to ion-selective membranes of low resistivity having a reinforcing fabric of non-woven material derived from carbonized polyacrylonitrile and their use in electrodialysis (ED) for desalting liquids.

2. Description of the Prior Art

Many uses have been found for permselective membranes, one of which is the demineralization of water and another which is to process whey to remove salts therefrom. Apparatus employing ion-exchange membranes and their method of operation are well known in the art and are more fully described in U.S. Pat. Nos. 2,708,653, 2,848,403, 2,826,544, 2,863,813, 3,003,940, 3,239,442, 3,341,441, 4,115,225 and many others.

Ion-exchange resins have a solid phase consisting of a homogeneous polymer with covalently bonded dissociable ion-exchange groups and mobile replaceable counter ions associated with them. These resins can be formed into dimensional structures such as sheets or membranes. To increase the mechanical strength of the membrane and to allow their manufacture in reasonably large sizes a reinforcing structure or material is imbedded therein such as a synthetic fabric of, for example, a woven glass sheet or a woven modacrylic fabric. The prior art has employed a wide range of materials in the manufacture of the reinforcing fabrics. Such materials have included polyesters (Dacron ®), polyamides (Nylon ®), acrylics (Orlon ®), modacrylics (Dynel ® or Kanecaron ®), vinylidene chlorides (Saran ®), tetrafluoroethylene (Teflon ®), glass (Fiberglas ®) rayons, polypropylene and the like usually having a visibly open structure as found in woven type fabrics.

SUMMARY OF THE INVENTION

It is therefore, an object of this invention to prepare a self-supporting homogeneous ion-exchange structure having low electrical resistance in which a sheet(s) or mat(s) of non-woven carbonaceous fiber material is embedded therein.

Another object is to produce both anion and cation permselective polymeric membranes measuring at least one centimeter in two dimensions which contain a backing or reinforcing fabric of non-woven carbonized polyacrylonitrile fibers possessing greatly improved electrical conductivity (DC mode) for use as hydraulic separators especially for use in electrodialysis, electrolytic, and other membrane cell equipment.

Other objects, features and advantages of the invention will in part be obvious and will in part appear hereinafter. For purposes of this disclosure the term "non-woven carbonized polyacrylonitrile fabric" is defined as a textile structure comprising carbonized or pyrolyzed polyacrylonitrile fibers which are held together to form a web or mat. Such material is not made by the usual process of spinning and weaving as occurs in the manufacture of the open mesh type woven fabrics. The carbonized polyacrylonitrile is normally produced by elevated temperature cracking of the polyacrylonitrile to form carbonaceous material. One such preferred non-woven fabric (Panex ®30) comprises a continuous 160,000 filament high strength, high modulus fiber tow. The surface of the fibers are treated to enhance interlaminar shear strength in a resin matrix composite. The carbonized PAN fabrics, both the non-woven and woven types disclosed in the present specification are readily available from Stackpole Fibers Co. of Lowell, MA under the registered trademark PANEX.

DESCRIPTION OF THE INVENTION

The solid polymeric structure suitable for use as the intermediate material in the manufacture of novel, ion-selective membranes can be prepared by copolymerizing a variety of monomers (which are well known in the art) under conditions that will yield a polymeric "board" structure containing a non-woven carbonized polyacrylonitrile fabric backing within the resin. For purposes of this disclosure a "board" is the sheet or film of a highly cross-linked polymeric resin having the ability to act as or be converted to an ion-permselective membrane. It will be apparent that the boards may not be endowed with ion-exchange characteristics of either anion or cation type until ion-exchange active groups have been attached thereto. The boards, however, are the base or intermediate material from which either cation or anion-exchange membranes may be obtained by known chemical treatment to introduce positive or negative ion-exchange groups. Reinforcement of the board is provided by one or more layers of a support material of non-woven carbonized polyacrylonitrile fabric which is not subject to chemical attack and on which the polymer is cast. The board itself is prepared for example by copolymerizing a monomeric compound having one polymerizable double bond such as a monovinyl compound such as for example styrene with a cross-linking monomeric compound having a least two polymerizable double bonds such as for example, divinylbenzene. An important factor in the fabrication of the membranes is the use of an inert non-polymerizable (NP) organic solvent into which the double bond monomeric compounds are first diluted prior to the polymerization. This inert solvent should be present during polymerization to the extent or at least 10% by volume based on the total volume of the monomeric mixture including the solvents. Although a minimum total solvent content of about 10% has been found effective for purposes of this invention, preferred embodiments include much larger amounts between 20–50%. Structures including as much as a total of 75% solvent have been found to be quite satisfactory. The monomeric mixture containing the non-woven carbon fabric is seeded with a small quantity of dissolved polymerization catalyst such as Azo-Bis-Isobutyronitrile. The total board thickness should be from 1 to 100 mils (preferably 5 to 25 mils).

For purposes of this disclosure, solvents are those having boiling points which are higher (preferable at least 10° C. higher) than the polymerization temperature employed, should be inert to the polymerization reaction (in that they do not react chemically or polymerize with the monomers) should preferably be totally miscible with the starting liquid monomers and should act as a swelling agent for the resulting solid copolymer by being absorbed or imbibed therein. The use of various solvents for membrane fabrication is fully disclosed in U.S. Pat. Nos. 2,730,768, 2,731,441, 2,780,604 etc. and include for example liquid aromatic hydrocarbons such as diethylbenzene; ketones such as methyl ethyl ketone; ethers such as diethylene glycol dimethyl ether (diglyme) etc. The volume of solvent present during polymerization determines the percent porosity and substantially fixes the solvent or water holding capacity or content of the resulting polymeric structure. The solvent contained in the polymeric structure can be replaced by another solvent, and the structure will imbibe about the same volume of water or other liquid as was present as original solvent during the polymerization reaction.

As was previously stated a preferred type of homogeneous membrane may be produced from a polymeric structure resulting from combining a polyvinyl aromatic compound such as divinyl benzene with a monovinyl aromatic compound such as styrene or ethyl styrene diluted in a solvent and polymerized in the presence of a dissolved catalyst.

These resulting polymers are converted into ionpermselective membranes by well known techniques as by the introduction of negatively charged groups such as sulfonate, carboxylate etc. or by the introduction of positively charged groups such as quaternized tertiary amines, etc. Positively charged groups can be introduced for example by chloromethylating the polymeric board structure and then aminating to introduce quaternary ammonium groups. Negatively charged groups can be introduced for example by sulfonating the board structure by reacting with a sulfonation agent such as concentrated sulfuric acid, oleum, chlorosulfonic acid, etc. Other suitable negatively charged groups are those generally used in ion exchange reactions, e.g. phosphonic, phosphinic, thiophosphinic and arsonic. Other suitable positively charged groups also known from the art include primary, secondary or tertiary amino groups, quaternary phosphonium groups, tertiary sulphonium groups, quaternary ammonium groups and the like.

Other monomers useful in the present invention are for example acrylic acid or acrylic esters for preparing weak acid carboxylic resins, vinyl pyridine and substituted vinyl pyridine for preparing weak base anion exchange resins which can be N-alkylated to produce quaternary ammonium strong base resins. Other nitrogen-containing vinyl monomers such as acrylamide and vinyl amines can be used to prepare anion exchange material.

A totally aliphatic type polymer which is also suitable in the present invention is fully disclosed in U.S. Pat. No. 4,231,855 (Hodgdon et al) and is prepared by the copolymerization of methacrylate ester monomers, that is, reacting a polyunsaturated crosslinking methacrylate ester monomer containing a least two vinyl groups with a potentially ionogenic methacrylate ester monomer. Suitable polyunsaturated crosslinking methacrylate esters are the polyol methacrylate ester monomers. These include the glycol dimethacrylates such as ethylene glycol dimethacrylate (EGDM), neopentyl glycol dimethacrylate, polyethylene glycol dimethacrylate, trimethylol propane trimethacrylate, bis-phenol A dimethacrylate, and pentaerythritol tri and tetramethacrylate.

In the synthesis of aliphatic anion selective membranes, methacrylate esters containing amine groups of the tertiary type are copolymerized with cross-linking methacrylate esters. The presence of the pendant amine groups provides sites for quaternization of the polymer. Suitable esters include especially dimethylamino ethyl methacrylate (DMAEM), diethylamino ethyl methacrylate, t-butylaminoethylmethacrylate and the like.

In the syntheses of aliphatic cation selective polymers the functional monomer employed includes, for example, 2 sulfoethyl methacrylate (2SEM), 2 methyl propane sulfonic acid and the like.

In the preparation of the aliphatic anion selective polymer, the polymer is formed by the reaction, for example, of ethylene glycol dimethacrylate (EGDM) with dimethyl amino ethyl methacrylate. The resulting polymerizate is then reacted with any N-alkylating agent so that the tertiary amine groups are converted to the quaternary ammonium salts to produce an anion selective structure.

In the preparation of the aliphatic cation selective polymer, the basic polymer is formed, for example, by reacting ethylene glycol dimethacrylate (EGDM) with 2 Sulfoethyl methacrylate (2 SEM) resulting in a sulfonic acid salt polymerizate where the reactive group consists of $SO_3^- R^+$ where R is for example a univalent cation of H, Na, K, $NH_4$ and the like.

The structures of the present invention may be formed by various methods. For example a mixture of liquid monomers and the reinforcing carbonized PAN fabric may be polymerized in sheet form between confining glass plates and then post treated if necessary to introduce cation or anion exchange groups as may be required. Of course the post treatment is not necessary where the monomer employed already contain exchange groups such as vinylsulfonic acid, aminated chloro methyl styrene, vinyl phosphonic acid, trimethylamino ethyl methacrylate and the like. The boards are formed on reinforcing or supporting carbonized PAN fabrics preferably by placing one or more sheets thereof on a flat bottom casting surface (such as a glass plate). The polymerizable monomeric components are poured over the carbonized polyacrylonitrile fabric support material, covered with a flat top casting surface (such as a glass plate) and the mass heated until polymerization is complete. For example, the monomer mixture may be poured into a rectangular tank into which glass plates and reinforcing webs or mats of the carbonized PAN are alternately placed in a stack arrangement and totally covered with the liquid mixture. Thus, there is between each pair of smooth glass plates the carbonized PAN sheet material completely saturated with the monomeric liquid mix. The parallel glass plates are spaced from each for a distance substantially equal to the thickness of the reinforcing sheet. The tray is then heated and the liquid mixture allowed to polymerize into a solid mass.

The polymeric board which acts as the skeleton for the various functional exchange groups of the carbonized PAN reinforced membrane of the present invention may be varied as to its chemical structure over a considerable range as is well known in the art of making membranes. For example, in a styrene-divinylbenzene copolymer, the monovinyl aromatic hydrocarbon monomeric component of the board structure can be employed individually or as mixtures and may be styrene (vinyl benzene) or its nuclear and/or alpha substituted derivatives such as ethyl vinyl benzene (ethyl styrene), vinyl toluene (methyl styrene) and its isomers, such as isopropyl styrene, chloromethyl styrenes such as vinyl benzyl chloride, also chlorostyrenes, paramethylstyrene, cyanostyrene, methoxystyrene, acetyl styrene, dimethylstyrene and the like.

The polyvinyl aromatic monomer which furnishes the cross linking groups to produce an insoluble resin may comprise divinyl benzene (DVB) and substituted derivatives thereof such as the nuclear and/or alpha substitued derivatives such as divinyl toluene, dimethyl divinyl benzene, dimethyl divinyltoluene and the like. Also useful are trivinyl-benzene, trivinyl-naphalene, vinyl acrylate, diallyphthalate etc. The divinyl benzene of commerce usually contains a large fraction of ethyl vinyl benzene (a non cross-linking agent) and also a small amount of nonpolymerizable solvent of diethyl benzene. The amount of the cross-linking agent employed may vary within wide limits from 20–80 mol % of the total polymerized monomers in the membrane resin phase with the preferable range being between 25–50 mol %.

The copolymerization of the monomers is accelerated by means of well recognized catalysts such as the azo catalysts (azo-bis-isobutyronitrile being the preferred reagent for this invention). The monomers may also be suitably co-polymerized by the well known art of irradiation whether the source is light or the more effective beta or gamma radiation waves.

Having described the invention in general terms the following examples will illustrate the process of preparing non-woven carbonized polyacrylonitrile fabric supported membranes and the unexpected benefits derived therefrom.

In the description and examples that follow, the membranes so fabricated will be designated as types 1 to 5 in conformity with the following description:

| Type | |
|---|---|
| Type 1. | Anion membranes synthesized by trimethyl amine amination of chloromethylated styrene-divinyl benzene copolymers. |
| Type 2A. | Anion membranes synthesized by methyl chloride alkylation of 2-tertiary amino ethyl methacrylate esters. Water content in 36–40% weight range. |
| Type 2B. | Same as above except water content in the 43–46% weight range. |
| Type 3. | Cation membranes synthesized by sulfonation of styrene divinyl benzene copolymers. |
| Type 4. | Cation membranes synthesized by polymerization of 2 sulfoethyl methacrylate esters with ethylene glycol dimethacrylate. |
| Type 5. | Anion membranes synthesized by quaterization reaction of vinyl benzyl chloride with dimethylamino ethyl methacrylate and post polymerized and cross linked by vinyl polymerization. |

EXAMPLE 1 (TYPE 5 ANION MEMBRANE)

64 milliliters (ml.) of vinyl benzyl chloride (VBC) was combined with 154 ml. of dimethyl amino ethyl methacrylate (DMAEM) in 75 ml. of isopropyl alcohol containing 0.0625% of the polymerization catalyst azo-bis-isobutyronitrile (AIBN). After stirring at room temperature the liquid mix was poured into a 6"×6" metal tray into which were laid in alternating fashion, glass plates (5"×5") and sheets of reinforcing fabric or cloth (4.5"×4.5") until the top of the monomer liquid level was reached. A single sheet of the reinforcing fabric was used between each pair of glass sheets. The sheets of fabric placed in alternating sequence were of two types; 0.050 cm. thick PANEX PWB-3, carbonized polyacrylonitrile and 0.054 cm. thick modacrylic woven fabric No. 386, manufactured by Uniroyal Co.

The entire tray was put into an oven and heated for 16 hours at a temperature range of 60°–85° C. which resulted in the polymerization of the liquid into a solid mass. The excess resin and the glass plates were removed to yield sheets of reinforcing fabric surrounded and impregnated with the polymerized resin. The resulting polymer sheets or membranes were soaked in methyl alcohol and than washed in running tap water to remove the alcohol. The resulting membranes which were free of leaks and voids are further described in the following table.

TABLE I

| Membrane Type | Reinforcing Fabric | % H$_2$O* | Thickness (cm) |
|---|---|---|---|
| ANION - Type 5 | Modacrylic (386) | 35–37 | 0.054 |
| ANION - Type 5 | PANEX PWB-3 (Woven) | 35–37 | 0.050 |

*% by weight of water in the resin

EXAMPLE 2

Anion membranes of Type 2B (see U.S. Pat. No. 4,231,855) were prepared in a manner similar to Example 1 using the following chemical formulation:

| | |
|---|---|
| Elthylene glycol dimethacrylate (EGDM) | 90.9 ml |
| Dimethyl amino ethyl methacrylate (DMAEM) | 89.1 ml |
| Diethyl benzene (DEB) | 120.0 ml |
| AIBN Catalyst | 3 gms |

Five different reinforcing fabrics were used in this preparation of which two were of the non-woven, matted carbon fiber type. All of the PANEX® carbon fabrics were derived from polyacrylonitrile. The resulting membranes were leak free.

TABLE II

| Membrane Type | Reinforcing Fabric | % H$_2$O | Thickness (cm) |
|---|---|---|---|
| ANION-2B | Modacrylic woven (386) (4 oz/yd$^2$) | 43–46 | 0.054 |
| ANION-2B | PANEX PWB-3, woven carbon (3 oz/yd$^2$) | 43–46 | 0.044 |
| ANION-2B | PANEX PW-6, woven carbon (6 oz/yd$^2$) | 43–46 | 0.071 |
| ANION-2B | PANEX 30-05, non-woven carbon (0.5 oz/yd$^2$) | 43–46 | 0.025 |
| ANION-2B | PANEX 30-30, non-woven carbon (2.3 oz/yd$^2$) | 43–46 | 0.085 |

EXAMPLE 3

Anion membranes of type 2B and cation membranes of type 3 (11"×13" sizes) were prepared by casting between glass plates as generally described in Example 1. Capacity measurements are reported based on milliequivalents per dry gram of resin. The membranes which were leak free were further characterized as follows:

TABLE III

| Membrane Type | Fabric | Capacity (meq/dgm) | % H$_2$O | Thickness (cm) |
|---|---|---|---|---|
| Cation-3 | Modacrylic-386 (4 oz/yd$^2$) | 2.60 | 46.0 | 0.054 |
| Cation-3 | PANEX 30-30 non-woven (2.3 oz/yd$^2$) | 2.48 | 45.8 | 0.089 |
| Anion-2B | Modacrylic-386 (4 oz/yd$^2$) | 2.30 | 44.5 | 0.052 |
| Anion-2B | PANEX 30-30 non- | 2.20 | 44.0 | 0.093 |

TABLE III-continued

| Membrane | | Capacity | | Thickness |
|---|---|---|---|---|
| Type | Fabric | (meq/dgm) | % H₂O | (cm) |
| | woven (2.3 oz/yd²) | | | |

EXAMPLE 4

A 9"×10" electrodialysis test unit or stack containing 10 cell pairs comprising alternating cation and anion membranes was employed using a batchwise system to treat synthetic seawater (35,000 ppm of salt) down to about 500 ppm of salt (potable water). A test run (A) was made employing the prior art modacrylic fabric reinforced membranes (as listed in Table III).

For comparison purposes, a similar run (B) was made using the non-woven, carbonized polyacrylonitrile backed membranes of the present invention (as also shown in Table III). Both units were operated at 0.5 volts/cell pair at about a 50% potable water recovery rate of 4GFD (gallons per day per square foot of membrane pair). As noted in Table IV, the test employing the thick 35 mil non-woven carbonized PAN reinforced membranes operated in spite of its thickness at a lower resistance (thus lower energy consumption) and increased current efficiency over the thinner 18 mil thick modacrylic reinforced membranes which is a totally surprising and unexpected result.

In Table IV Run A employed Cation Type-3, Anion Type-2B (modacrylic-woven 18 mil) and Run B employed Cation Type-3, Anion Type-2B (PANEX 30—30 non-woven 35 mil).

TABLE IV

| Run | Initial Current Density (ma/cm²) | Water Transfer % | Initial Rp-ohm-cm² per cell pair | D.C. Energy Consumption (KWH/1000 gals) | Current Efficiency (Average) | Average Thickness Membrane Pair (cm) |
|---|---|---|---|---|---|---|
| A | 24.8 | 28.2 | 20.2 | 57.6 | 64.5 | 0.106 |
| B | 32.4 | 29.8 | 15.7 | 54.2 | 74.2 | 0.178 |

EXAMPLE 5

Woven and non-woven carbonized polyacrylonitrile and woven modacrylic reinforced cation (type 4) and anion (type 2A) membranes were prepared (Table V) to compare their resistivities and operating characteristics while employed in the electrodialysis of sea water. The resulting membranes were free of voids and leakage. The results of the electrodialysis runs using matched pairs of membranes are compared and summarized in Table VI. The test runs reduced the salt content of synthetic sea water (35,000 ppm) to about 500 ppm with a 50% potable water recovery rate.

TABLE V

| Membrane | | Capacity | % | Thickness |
|---|---|---|---|---|
| Type | Fabric | MEQ/gm Resin | H₂O | (cm) |
| Cation 4 | PANEX 30-10 (non-woven) 14 mil | 2.46 | 39.0 | 0.034 |
| " | PANEX PWB-6 (woven) 26 mil | 2.15 | 36.7 | 0.067 |
| " | PANEX PWB-3 (woven) 18 mil | 2.29 | 34.0 | 0.046 |
| " | Modacrylic (woven) 18 mil | 2.34 | 35.6 | 0.056 |
| " | Modacrylic (woven) 14 mil | 2.30 | 38.5 | 0.035 |
| Anion 2A | PANEX 30-10 (non-woven) 14 mil | 2.54 | 34.9 | 0.037 |
| " | PANEX PWB-6 (woven) 26 mil | 2.79 | 41.1 | 0.067 |
| " | PANEX PWB-3 (woven) 18 mil | 2.83 | 32.4 | 0.044 |
| " | Modacrylic (woven) 18 mil | 2.83 | 37.2 | 0.056 |
| " | Modacrylic (woven) 14 mil | 2.70 | 36.2 | 0.037 |

TABLE VI

| Run | Membrane Pair | Initial Current Density (ma/cm²) | % Water Transfer | Initial Rp2(ohm-cm² per cell pair) | D.C. Energy Consumption (KWH/1000 gals) | C.E. AVG. | GFD* | Initial Volts/ Cell Pair | Average Thickness Membrane Pair (cm) |
|---|---|---|---|---|---|---|---|---|---|
| C | Cation 4, Anion 2A, Modacrylic (woven) 18 mil (4 oz/yd²) | 18.7 | 20.8 | 24.3 | 43.3 | 76.9 | 4.0 | 0.45 | 0.112 |
| D | Cation 4, Anion 2A Modacrylic (woven) 14 mil (3.5 oz/yd²) | 18.8 | 20.5 | 21.0 | 37.6 | 82.4 | 4.0 | 0.39 | 0.072 |
| E | Cation 4, Anion 2A PANEX 30-10 (1 oz/yd²) (non-woven) 14 mil | 23.5 | 18.2 | 9.6 | 20.5 | 85.9 | 4.0 | 0.23 | 0.071 |
| F | Cation 4, Anion 2A PANEX PWB-6 (6 oz/yd²) (woven) 26 mil | 16.5 | 15.3 | 31.9 | 43.2 | 89.1 | 4.0 | 0.53 | 0.132 |
| G | Cation 4, Anion 2A Modacrylic (non-woven) 10.3 mil | 23.6 | 21.8 | 12.5 | 24.0 | 85.2 | 4.0 | 0.30 | 0.052 |

*GFD = Gallons per day of product per effective square foot of cell pair area.

Based on the data obtained from the electrodialysis test runs A and B using mostly high water content membranes, (Table IV) and runs C, D, E, F and G (Table VI) using low water content membranes the absolute resistivity values ($\rho p$) of each of the cell pair combinations was calculated as follows:

$$\text{resistivity of each cell pair} = \rho_p = \frac{r_p(A)}{2tm}$$

where:
tm = average thickness of each membrane in the cell pair in centimeters
A = active area of membrane exposed to the salt water during ED in cm².
$r_p = (R_p/A)$ in ohms
$R_p$ = measured DC resistivity of cell pair in ohm-cm² during ED.

$$\text{thus } \rho_p = \frac{r_p(A)}{2tm} = \frac{R_p}{2tm} \text{ ohm-cm}$$

The symbol $\rho_p{}^c$ where used below donates the resistivity of the cell pair $(\rho_p)$ when corrected to zero fabric volume using the following resistivity correction equation:

$$\rho_p{}^c = \frac{V_r + V_{H_2O}}{V_r + V_{H_2O} + V_B} \rho_p \text{ in ohm-cm}.$$

where:
$V_r$ = the resin volume (or dry weight) in the membrane (Resin density $\simeq 1.0$ gm/cc)
$V_{H_2O}$ = the water volume in the membrane (water density $\simeq 1.0$ gm/cc)
$V_B$ = the fabric volume (cc's) in the membrane (Modacrylic fabric density $\simeq 1.3$ gm/cc) (Carbonized polyacrylonitrile density $\simeq 1.7$ gm/cc)
The symbol $\rho$ denotes the Greek letter "Rho".

| Run | $R_p$ (ohm-cm²) | $V_r$ | $V_{H_2O}$ | $V_B$ | Fabric Weight (gm) |
|---|---|---|---|---|---|
| A | 20.2 | 1.00 | 0.82 | 0.340 | 0.440 |
| B | 15.7 | 1.00 | 0.71 | 0.084 | 0.143 |
| C | 24.3 | 1.00 | 0.60 | 0.34 | 0.440 |
| D | 21.0 | 1.00 | 0.60 | 0.44 | 0.570 |
| E | 9.6 | 1.00 | 0.60 | 0.057 | 0.097 |
| F | 31.9 | 1.00 | 0.60 | 0.28 | 0.475 |
| G | 12.5 | 1.00 | 0.60 | 0.19 | 0.245 |

The following (Table VII) list the resistivities ($\rho_p$ and $\rho_p c$) in ohm-cm of the membrane cell pairs employed during synthetic sea water electrodialysis test runs A through G where:

$$\text{Resistivity } \rho(\text{Rho}) = \frac{RA}{l}$$

where:
R = resistance in ohms
A = area in cm²
l = thickness in cm
$\rho p$ = resistivity measurement of a membrane pair taken during the test run
$\rho p^c$ = the resistivity measurement after correction for fabric volume.

TABLE VII

| Test Run | $\rho_p$ (ohm-cm) | $\rho_p{}^c$ (ohm-cm) |
|---|---|---|
| A (Modacrylic-woven) | 191 | 160 |
| B (Panex 30-30, non-woven) | 88 | 84 |
| C (Modacrylic-woven) | 217 | 178 |
| D (Modacrylic-woven) | 292 | 228 |
| E (Panex 30-10, non-woven) | 133 | 125 |
| F (Panex PBW-6-woven) | 242 | 206 |
| G (Modacrylic-non-woven) | 240 | 215 |

From Table VII it is readily seen from runs B and E how superior the Panex-30 non-woven carbonized polyacrylonitrile reinforced membranes are, in DC conductivity (i.e. resistivity) compared to those reinforced with non-woven or woven modacrylic fibers (runs A, C, D and G) or with woven carbonized PAN fabric (run F). It will be seen from Table VII that it was quite unexpectedly discovered that the use of a reinforcing material of non-woven mat or felt of carbonized polyacrylonitrile fibers resulted in membranes having substantially lower direct current resistances ($\rho$) compared to the membranes reinforced with the prior art modacrylic fabric. Even more surprising is the substantial difference noted between the woven and non-woven fabrics made of the same carbonized polyacrylonitrile material. This improvement which is novel and totally unexpected translates into a substantially lower energy cost and higher efficiency in the operation of electrodialysis stacks.

As many apparently widely different embodiments of this invention may be made without departing from the spirit and scope thereof, it is to be understood that the invention is not limited to the specific embodiments thereof except as defined in the appended claims.

The embodiments of this invention in which an exclusive property or privilege is claimed are defined as follows:

1. An electrically conductive, cross-linked substantially hydraulically impermeable, polymeric ion-exchange selective resin membrane having embedded therein a reinforcing matrix or backing of a fabric structure; the improvement comprising a fabric consisting of non-woven, carbonized polyacrylonitrile fibers.

2. The ion-exchange selective membrane of claim 1 having a multi-layered reinforcing structure comprised of a plurality of said fabric sheets arranged in substantially face to face relationship with respect to one another.

3. The method of producing a reinforced highly conductive ion-exchange selective membrane comprising the steps of providing a reinforcing structure consisting of a non-woven, carbonized polyacrylonitrile fibrous fabric material, impregnating said fabric with an ion-exchange polymerizable resin liquid mix, and thereafter curing said liquid mix to produce a solid polymerized, low resistance, substantially hydraulically impermeable, ion-exchange selective membrane.

4. The method of claim 3 wherein a plurality of sheets of said carbonized fabric are employed as a reinforcing structure.

5. An electrochemical cell apparatus for transferring ions from one solution to another solution comprising liquid containing chambers separated by ion-permeable membranes and having terminal electrodes for passing a direct current transversely through said chambers and membranes, the improvement wherein at least some of said membranes have imbedded therein a reinforcing fabric of non-woven, carbonized polyacrylonitrile fibers.

* * * * *